US012043976B2

(12) United States Patent
Anderson et al.

(10) Patent No.: US 12,043,976 B2
(45) Date of Patent: Jul. 23, 2024

(54) MASONRY BLOCK

(71) Applicant: Mortarless Technologies LLC, Rochester, MN (US)

(72) Inventors: Edward J. Anderson, Littleton, CO (US); Geoffrey S. Parrington, Thornton, CO (US); Dion T. DeMeyer, Erie, CO (US)

(73) Assignee: Mortarless Technologies, LLC, Rochester, MN (US)

( * ) Notice: Subject to any disclaimer, the term of this patent is extended or adjusted under 35 U.S.C. 154(b) by 359 days.

(21) Appl. No.: 17/361,032

(22) Filed: Jun. 28, 2021

(65) Prior Publication Data

US 2021/0395971 A1 Dec. 23, 2021

Related U.S. Application Data

(60) Continuation of application No. 15/699,907, filed on Sep. 8, 2017, now Pat. No. 11,053,656, which is a division of application No. 14/176,991, filed on Feb. 10, 2014, now Pat. No. 9,758,943.

(60) Provisional application No. 61/762,685, filed on Feb. 8, 2013.

(51) Int. Cl.

| | |
|---|---|
| ***E02D 29/02*** | (2006.01) |
| ***B28B 7/00*** | (2006.01) |
| ***B28B 7/06*** | (2006.01) |
| ***B28B 7/10*** | (2006.01) |
| ***B28B 7/34*** | (2006.01) |

(52) U.S. Cl.

CPC ........ *E02D 29/0266* (2013.01); *B28B 7/0044* (2013.01); *B28B 7/0073* (2013.01); *B28B 7/10* (2013.01); *B28B 7/348* (2013.01); *B28B 7/007* (2013.01); *B28B 7/06* (2013.01); *E02D 29/025* (2013.01)

(58) Field of Classification Search

CPC .......................... E02D 29/0266; E02D 29/025

See application file for complete search history.

(56) References Cited

U.S. PATENT DOCUMENTS

| | | | |
|---|---|---|---|
| 599,786 | A | 3/1898 | Katz |
| 1,993,291 | A | 3/1935 | Vermont |
| 3,426,122 | A | 2/1969 | Gaudelli et al. |
| 3,595,518 | A | 7/1971 | Gaudelli et al. |
| 3,883,109 | A | 5/1975 | Hahne |
| 4,193,718 | A | 3/1980 | Wahrendorf et al. |
| 4,512,685 | A | 4/1985 | Hegle |
| 4,647,000 | A | 3/1987 | Osada |
| 5,066,169 | A | 11/1991 | Gavin |

(Continued)

FOREIGN PATENT DOCUMENTS

| | | | | |
|---|---|---|---|---|
| GB | 2158860 A * | 11/1985 | | E02B 3/14 |
| WO | WO 1988/007920 | 10/1988 | | |

*Primary Examiner* — Tara Mayo

(74) *Attorney, Agent, or Firm* — Fish & Richardson P.C.

(57) ABSTRACT

A method of forming simulated stone or brick column or a retaining wall is made up of rows of masonry blocks of generally trapezoidal configuration arranged in end-to-end relation to one another in each row, each block including a recessed portion being aligned with one another in each row and each block having textured wall surfaces simulating the appearance of brick or stone along one or more wall surfaces arranged in different configurations without the necessity of interlocking the blocks together.

23 Claims, 4 Drawing Sheets

(56) References Cited

U.S. PATENT DOCUMENTS

| | | | | |
|---|---|---|---|---|
| 5,161,918 | A | 11/1992 | Hodel | |
| 5,333,427 | A * | 8/1994 | Uhlik | E04C 1/42 52/308 |
| 5,350,256 | A | 9/1994 | Hammer | |
| 5,417,523 | A | 5/1995 | Scales | |
| 5,505,034 | A | 4/1996 | Dueck | |
| 5,622,456 | A | 4/1997 | Risi et al. | |
| 5,788,423 | A | 8/1998 | Perkins | |
| 5,820,304 | A | 10/1998 | Sorheim et al. | |
| D403,437 | S | 12/1998 | Risi et al. | |
| 5,843,327 | A | 12/1998 | Lindgren | |
| 5,945,053 | A | 8/1999 | Hettinga | |
| 6,082,933 | A | 7/2000 | Maguire et al. | |
| 6,224,295 | B1 | 5/2001 | Price et al. | |
| 6,616,382 | B2 | 9/2003 | Woolford et al. | |
| 6,827,527 | B2 | 12/2004 | Conkel et al. | |
| 6,884,004 | B1 | 4/2005 | Scales et al. | |
| 7,267,321 | B1 | 9/2007 | Morrell | |
| 7,549,616 | B1 | 6/2009 | Koren | |
| 7,553,109 | B2 | 6/2009 | Blundell | |
| 7,618,578 | B2 | 11/2009 | Manthei et al. | |
| 7,687,006 | B2 | 3/2010 | Manthei et al. | |
| 7,931,248 | B2 | 4/2011 | Korwin-Edson et al. | |
| 8,101,113 | B2 | 1/2012 | Castonguay et al. | |
| 2001/0019684 | A1 | 9/2001 | Manthei et al. | |
| 2003/0070386 | A1 | 4/2003 | Hampton | |
| 2003/0160147 | A1 | 8/2003 | Manthei | |
| 2003/0164574 | A1 | 9/2003 | Hammer et al. | |
| 2004/0074167 | A1 | 4/2004 | Drost | |
| 2005/0086892 | A1 | 4/2005 | Dean | |
| 2006/0096180 | A1 | 5/2006 | Price | |
| 2007/0045897 | A1 | 3/2007 | Alexander et al. | |
| 2007/0258776 | A1 | 11/2007 | Strand et al. | |
| 2008/0095584 | A1 | 4/2008 | Strand et al. | |
| 2008/0260474 | A1 | 10/2008 | Koster | |
| 2008/0272132 | A1 | 11/2008 | Afflerbach et al. | |
| 2009/0094917 | A1 | 4/2009 | McIntosh | |
| 2009/0185870 | A1 | 7/2009 | Shaw | |
| 2010/0133725 | A1 | 6/2010 | McCaskey | |
| 2011/0013991 | A1 | 1/2011 | Watson et al. | |
| 2011/0217127 | A1 | 9/2011 | MacDonald | |
| 2012/0057939 | A1 | 3/2012 | Bone | |
| 2012/0126451 | A1 | 5/2012 | Owen | |

* cited by examiner

MASONRY BLOCK

CROSS-REFERENCE TO RELATED APPLICATIONS

This application is a continuation of allowed U.S. Ser. No. 15/699,907, filed Sep. 8, 2017 titled METHOD OF MAKING MOLDED CONCRETE BLOCKS HAVING SIMULATED BRICK OR STONE OUTER SURFACES, which is a divisional of U.S. Ser. No. 14/176,991 (now U.S. Pat. No. 9,758,943), filed Feb. 10, 2014 titled MOLDED CONCRETE BLOCKS HAVING SIMULATED BRICK OR STONE OUTER SURFACES AND METHOD OF MAKING SAME, which claims priority to, and the benefit of, U.S. Provisional Application No. 61/762,685 filed Feb. 8, 2013 for COMPOSITE MOLDED CONCRETE BLOCKS HAVING TEXTURED FRONT SURFACES DEFINING SIMULATED BRICK OR STONE AND MORTAR CLUSTERS AND METHOD OF MAKING SAME all of which are incorporated by reference herein.

BACKGROUND AND FIELD

There is a need for concrete or masonry blocks which can be molded with different textured surfaces and combined to form retaining walls of different sizes and configurations in a simplified, efficient manner. In this regard, it is highly desirable to form each block in a mold which is positioned to provide a textured finished face for each block in a front vertical wall of the mold, and the remainder of the side and end wall surfaces of the mold inclining downwardly and inwardly to result in the formation of downwardly tapered side and rear walls in the resultant block in order to facilitate removal of the block from the mold. In order to further expedite removal of each block, a hinge is provided in opposite sides or along the bottom of each mold together with placement of cavities in the bottom and rear walls of each block in a manner to be described. One or more molds may be placed on a production board, the molds preferably being formed of a rubber or rubber-like material, and the blocks are formed by a wetcast process followed by curing and separation from each mold. In particular, the concrete block is of generally trapezoidal configuration with a front textured surface which takes on the appearance of a brick, stone and mortar cluster, different stone or rock-like textures. Each block is characterized also by having a rear wall and sidewalls joined together into a trapezoidal configuration, and the blocks can be arranged in various configurations, such as, for example, straight, rectangular, circular or serpentine walls without the necessity of inter-locking or otherwise physically joining the blocks together.

When used for retaining walls, a typical block is dimensioned to be 16" wide by 6" high at the front wall surface 12 and 8" to 9" in depth from the front surface 12 to the rear surface 14 depending upon the depth of the texture and the slope at the rear of the block 10 and will weigh in the order of thirty to fifty pounds each, although dimensions and weights may vary without departing from the scope. If necessary, the blocks can be joined by the application of construction adhesive between layers of block to prevent shifting in relation to each other. For taller retaining walls the blocks can also be anchored into the earth fill behind the wall by the use of a geogrid material that will extend between upper and lower layers of blocks. In addition, rods may be placed under each geogrid and within the void on the underside of each block and further anchored by the use of the elongated rods positioned against the geogrid in each void and locked in place by means of friction or pinch points between each rod and void. Both the geogrid and rod for each layer will extend continuously in a lengthwise direction beneath each row of blocks although these may be alternated as well. Also, the rods should be flexible enough to permit shaping of the entire wall into different configurations.

There is provided a method for molding a concrete block comprising the steps of: providing an outer rigid form having upstanding front and rear walls and opposite end walls arranged in a generally rectangular configuration; an elastomeric insert having a generally rectangular cavity defining front and rear wall surfaces and opposite end surfaces removably inserted into the form, at least one of the front, rear and end wall surfaces having a desired texture simulating a brick or stone to a block to be cast in said cavity; providing an upper opening into the cavity and filling the cavity with a wet cast colored concrete; vibrating the mold to densify and level out the concrete in the mold; curing the concrete in the mold over a predetermined time interval to form a hardened block of concrete; and removing the block from the mold.

DETAILED DESCRIPTION OF EMBODIMENTS

Figure 1:
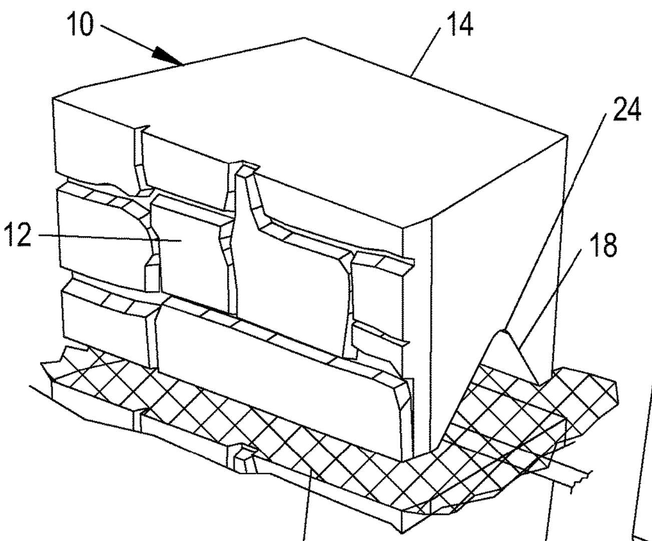
FIG. 1 is a front perspective view of one form of concrete block illustrating placement of a geogrid and rod into a void in the undersurface of each block in accordance with one aspect.
Figure 2:
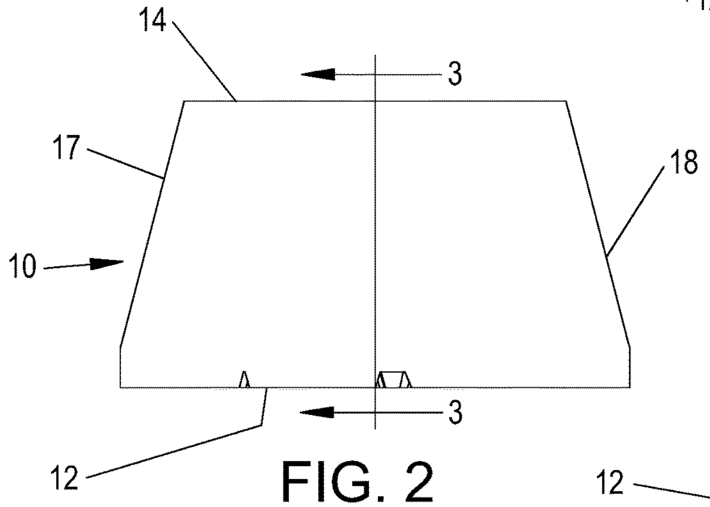
FIG. 2 is a top plan view of FIG. 1.
Figure 3:
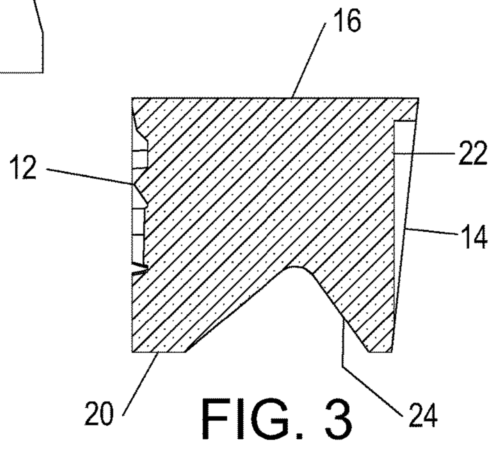
FIG. 3 is a cross sectional view taken about lines 3-3 of FIG. 2.

Referring in detail to the drawings, a composite concrete or masonry block 10 is illustrated in FIGS. 1-3 and comprises a front textured wall surface 12 and a rear wall surface 14, which is tapered downwardly from a top horizontal surface 16. Similarly, opposite sidewalls 17 and 18 are generally rectangular or trapezoidal in shape and taper downwardly from the top surface 16, and along with the front and rear surfaces 12 and 14 terminate in a bottom horizontal surface 20 which is parallel to the top surface 16. It will be evident by virtue of the downwardly tapered rear surface 14 and sidewall surfaces 17 and 18 which terminate in adjoining relation to the bottom surface 20 that the area or size of the bottom surface is less than the area of the top surface. Nevertheless, by virtue of the perpendicular relationship between the front surface 12 and the bottom surface 20, the frontal surface is upstanding or vertical when the bottom surface 20 is resting upon a horizontal surface, such as, level ground or on the level top surface of a lower adjoining block of a retaining wall as will be hereinafter described.

Preferably, the rear surface 14 is formed with a cavity 22 and the bottom surface is formed with a cavity 24 that extends the length of the bottom surface 20 to reduce the weight of each block and facilitate gripping of the rear surface to remove from the mold and for carrying purposes.

Figure 4:
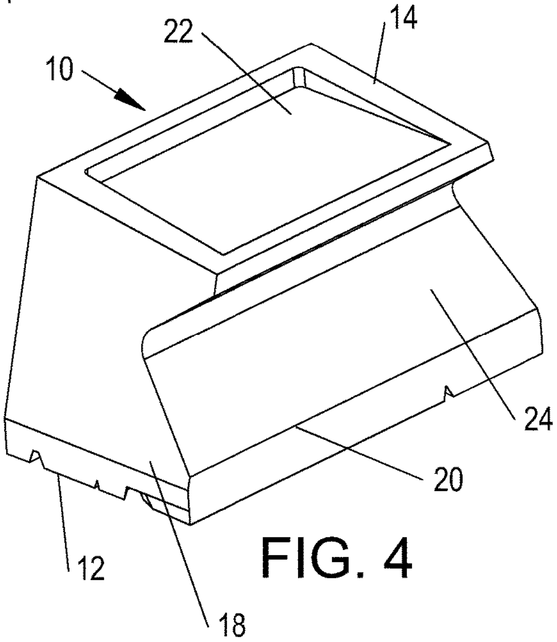
FIG. 4 is a rear view of FIG. 1.
Figure 5:
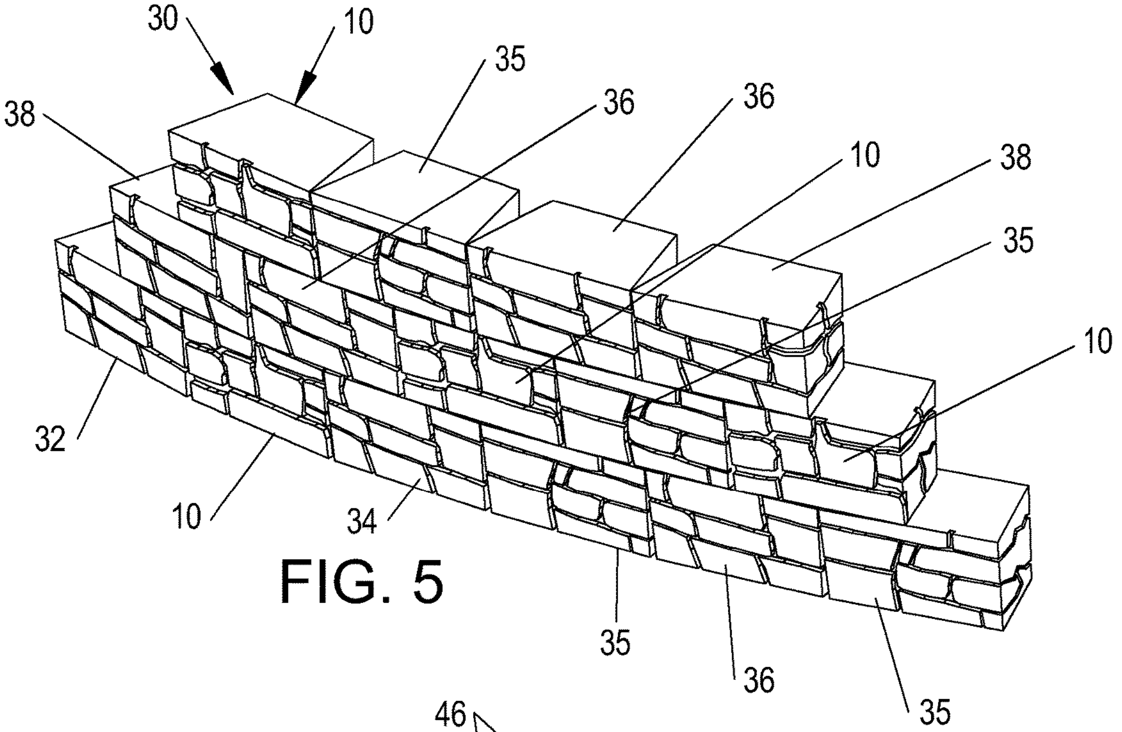
FIG. 5 is a perspective view of a retaining wall comprised of a number of composite blocks having different textured frontal surfaces and end surfaces.

For the purpose of illustration but not limitation, FIGS. 4 and 5 illustrate the utilization of concrete blocks 10 of the present invention in the construction of a retaining wall 30. Typically, the finished dimension of each block 10 may be on the order of 16" wide by 6" high at the front wall surface 12 and 8" to 9" in depth from the front surface 12 to the rear surface 14 depending upon the depth of the texture and the slope at the rear of the block 10. Again, the voids or cavities 22 and 24 in each block on the rear surface 14 and bottom surface 20 serve to reduce the overall weight of each block 10 by reducing the amount of material required without reducing the overall dimensions of each block. Also, the cavity 22 serves as a lifting handle to assist in lifting the retaining wall block from the mold without disturbing the overall dimensions of the block, along with the use of a vacuum to hold the stone while the mold is being removed by hand. The mold may also be removed manually by turning the mold over and allowing the block to be removed by gravity pull.

Figure 12:
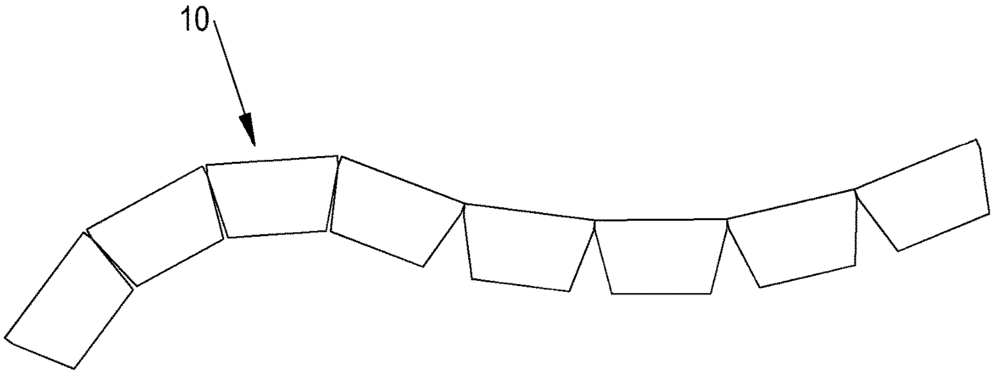
FIG. 12 is a top plan view of a retaining wall in a serpentine form.

In the retaining wall structure illustrated in FIG. 5, like blocks are correspondingly enumerated. Thus, the lower course of blocks 32, 10, 34, 35 and 36 are placed on a level surface either above or below ground level to establish a firm footing for the retaining wall. The next course consisting of blocks 38, 36, 10, and 35 may be placed directly on the top surfaces 20 of the first course and an upper course comprises blocks 10, 35, 36 and 38. When erected along a straight or curved line the upper front chamfered vertical edges of the adjoining or adjacent blocks are positioned flush with one another with a slight gap between facing sidewalls as a result of the tapered configuration of the sidewalls as described earlier. Blocks can be joined by use of construction adhesives between the layers to prevent movement in relation to one another. Of course, if the retaining wall is curved to any degree or serpentine as shown in FIG. 12, the upper edges and adjoining edges will not be completely flush with one another but the chamfered front vertical corners and the wedge shape of the block itself allows for easy configuration of the curved wall.

Variations of texture as illustrated in FIGS. 4 and 5 will be hereinafter discussed in greater detail in connection with the method of manufacture, and the same is true of the composition of the concrete and additives utilized to control the characteristics of the concrete all in accordance with well-known practice. Thus, any variety of concrete mixture can be used depending upon the desired strength, color and other characteristics to be incorporated into the blocks.

Molds and Method of Manufacturing Blocks

Figure 6:
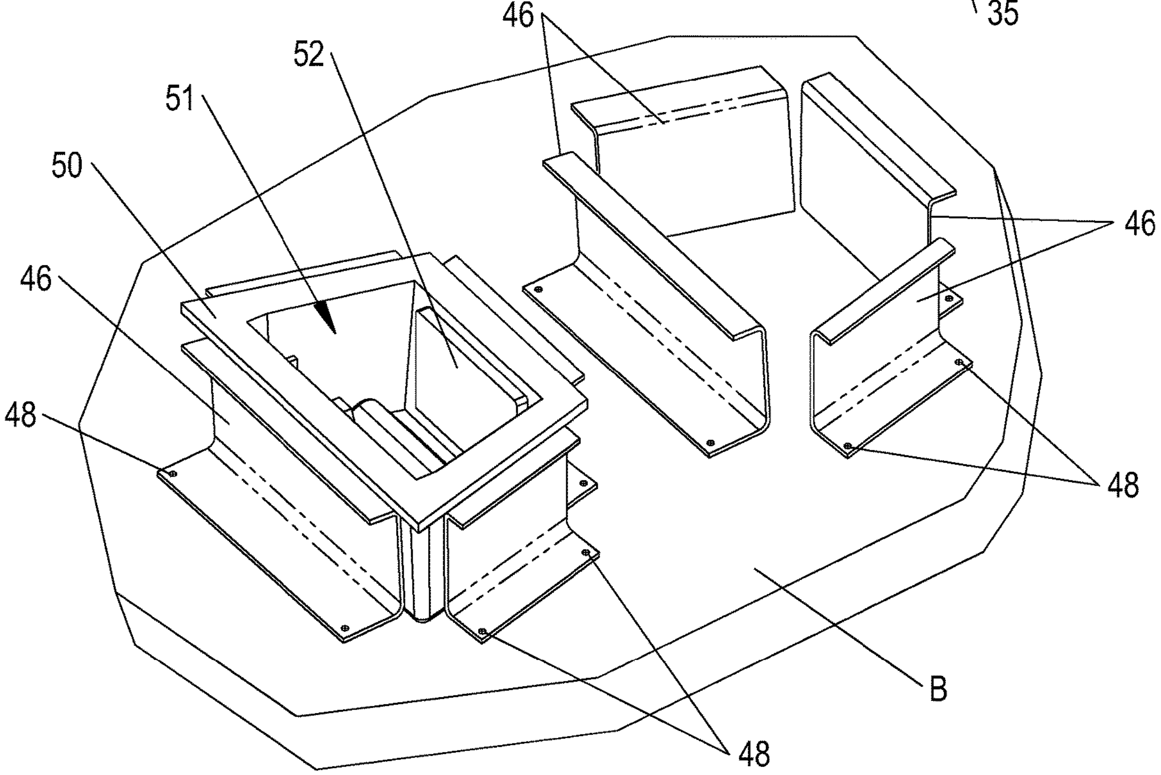
FIG. 6 is a perspective view of a production board having a plurality of support frames with a mold inserted in one of the support frames.
Figure 7:
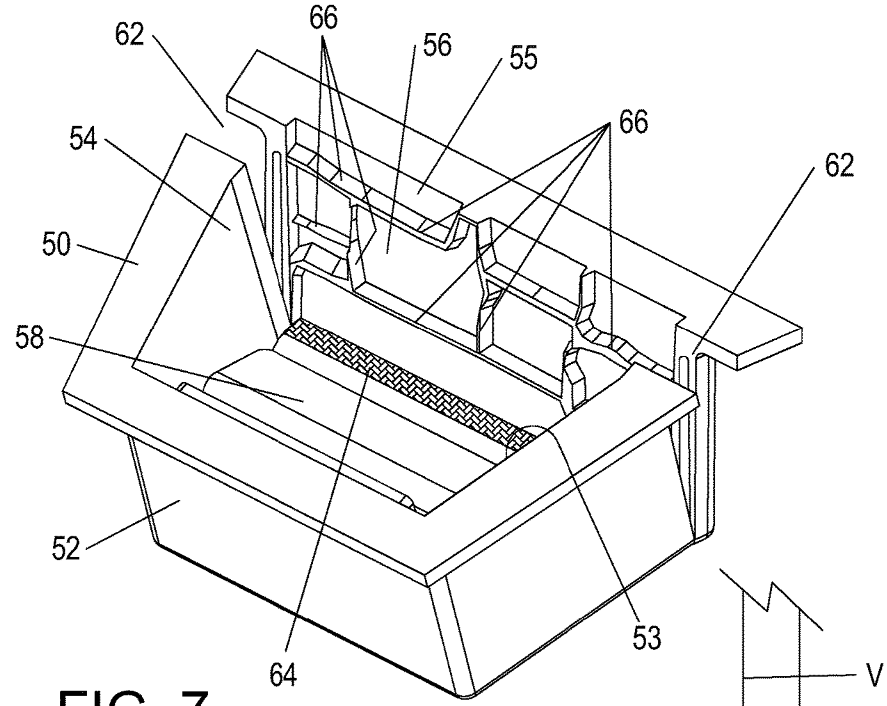
FIG. 7 is a perspective view of a preferred form of mold including a V-shaped slot at each end of the mold adjacent to its front wall.
Figure 8:
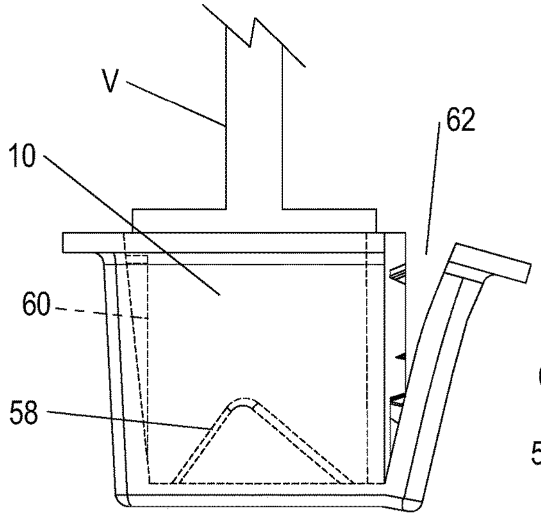
FIG. 8 is a side view of a mold filled with concrete beneath a vacuum tool.

As illustrated in FIGS. 6-8, the concrete blocks are formed by introduction of a concrete mixture consisting of aggregate sand, cement, water, and water-reducing admixtures, with or without iron oxide color. The minimum strength of the concrete is on the order of 4,000 psi. Each mold 50 is preferably of a rubber or rubber-like composition having a central cavity 51 of generally trapezoidal configuration defined by a back wall 52, opposite sides 53, 54 and a front textured wall 55, the walls 52-54 being tapered on both sides to facilitate ease of removal of the hardened concrete from the rubber mold as well as from a production board B. In turn, front wall 55 has an inner face of a stone texture which is duplicated from natural stone. The stone texture is transferred to the mold using a multi-step process combining natural stone, liquid rubber or any liquefied material that will harden to duplicate the texture formed by rubber. A raised portion 58 in the bottom wall of the mold is of elongated triangular configuration and is shaped to form the void or cavity 24 extending from end-to-end in each block; and a raised portion 60 in the rear wall 52 is of elongated generally triangular configuration and results in the cavity 22 in the rear surface of each block.

In a preferred method of manufacture, one or more rubber molds 50 are placed on a standard production board B which can be of various sizes depending upon the manner in which concrete is placed in each mold. For each rubber mold 50, in order to maintain the desired shape, one well-known procedure is to utilize a BFS SlabFlex® machine. Any other type of machinery that produces wet cast products may be used as well. Any mold configuration of one or more molds can be mounted on a board B or platform prior to placing concrete in the molds. The molds are positioned so that the textured front wall surface 56 is in a vertical position. Support frames 46 are anchored by screws 48 on the production board B in surrounding relation to the mold during concrete placement. The frames 46 are tight enough to prevent the vertical keyways 62 cut in the mold from opening and allowing concrete to leak through the cuts as hereinafter described in more detail.

Preliminary to placement of the concrete in each mold, a form release agent is applied to the interior of the mold to prevent the concrete from sticking to the mold and prevent bugholes from occurring. Preferably, a water-based release agent is used. The inner front wall surface of each mold is surfaced with a different brick or rock orientation. The stone texture may be duplicated from a variety of different styles of natural rock while still maintaining the overall shape of the block.

The mold may also have a series of intersecting, crossed ridges, or ribs 66 projecting inwardly from a common support surface or mat, which is secured to the inner front wall surface of the mold. The ridges are of sufficient rigidity to resist bending when the concrete is poured into the mold so as to form joints or spacing between the individual bricks or rocks very much similar in appearance to bricks or stones and mortar, and the thickness and depth of each ridge may be varied as illustrated. In addition, the wet cast machine allows use of multiple colors of concrete to produce a realistic looking natural stone color. A base color with an accent color can be utilized to provide the naturally variegated look of real stone.

Once the molds are placed in the production board, the production board B is then advanced through the filling apparatus for the type of concrete placement equipment that is used to fill the mold with concrete. A preferred approach is to fill the mold in the mold cavity by pouring wetcast concrete into the mold cavity. The SlabFlex® machine permits use of two or more colors of concrete to produce a realistic looking natural stone color, and the entire matrix of the concrete is colored concrete. A base color with an accent color may be used to provide the naturally variegated look of real stone or basic gray concrete without color may be used. The production board B is then run through various vibration cycles to densify and level the concrete in the rubber mold followed by smoothing the top surface by use of a hand cement finishing tool and placing the production board B and molds full of concrete in a suitable curing area during the hardening phase which is normally in the range of 12-20 hours depending upon the type of concrete mixture used and the size of the mold.

Figure 9:
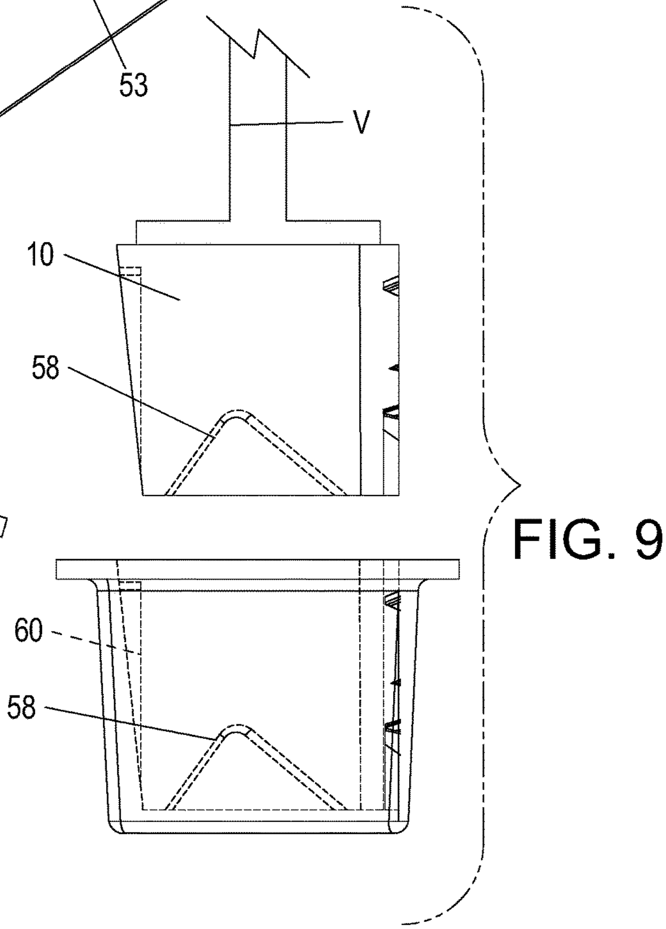
FIG. 9 is an exploded view of the mold shown in FIG. 8 with the cured block being removed with the aid of the vacuum tool.

After curing, each concrete block is removed from the mold and typically is done by hand or using a vacuum demolding device, as shown in FIGS. 8 and 9. This is done by removing the mold and concrete block from the frame 46 using the vacuum, followed by using a manual process and removing the remainder of the concrete block. The mold may be peeled off of the textured wall of the mold along the keyways 62 or hinged portions of the mold as shown in FIGS. 8 and 9. In this way, the textured wall 56 may be manually peeled away from the textured face to preserve the three-dimensional configuration of the textured wall. In other words, the keyways 62 permit hinging of the rubber mold to facilitate removal of the hardened concrete. The rubber molds incorporate a reinforced mesh fabric or strap 64 embedded within the rubber so as to provide reinforcement to the keyways 62 and to prevent tearing at the bottom of the mold. Reversing the mold and allowing the block to be pulled out using gravity is another form of removal. The mold is then placed back into the frames 46 on the production board B.

In the removal process it will be appreciated that the trapezoidal or downwardly tapered configuration of the sidewalls and rear walls greatly facilitate removal of each block along with the formation of voids 22 and 24, particularly the void or cavity 22 in the rear wall surface. In addition, the tapering of the sidewalls 17 and 18 rearwardly away from the front wall 12 enables much greater latitude in the formation of each wall into linear, curved, square or rectangular shapes.

Figure 10:
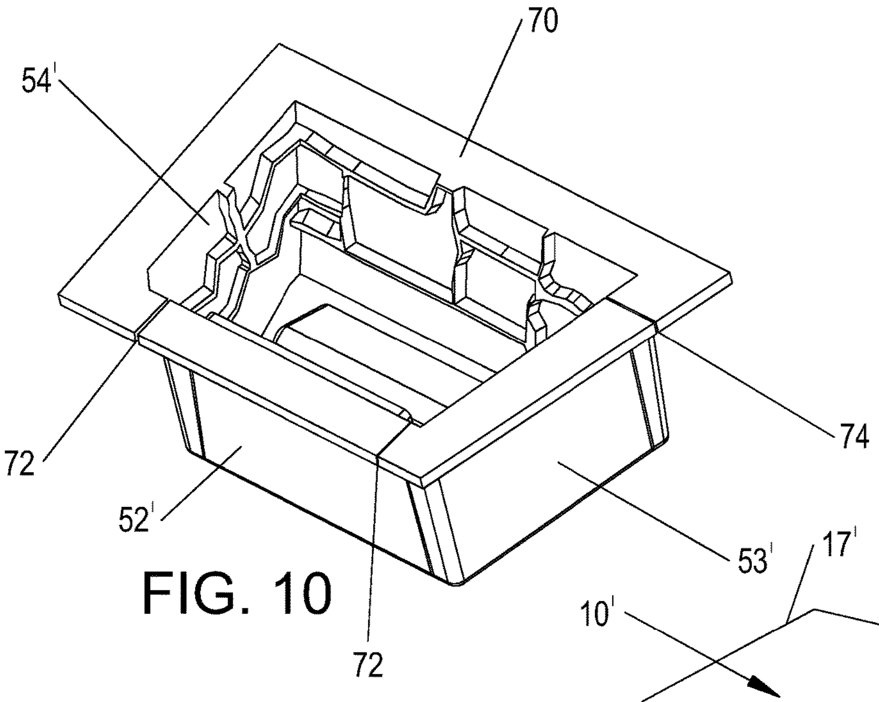
FIG. 10 is a perspective view of a modified form of mold having textured surfaces along the front and end of the interior of the mold.
Figure 11:
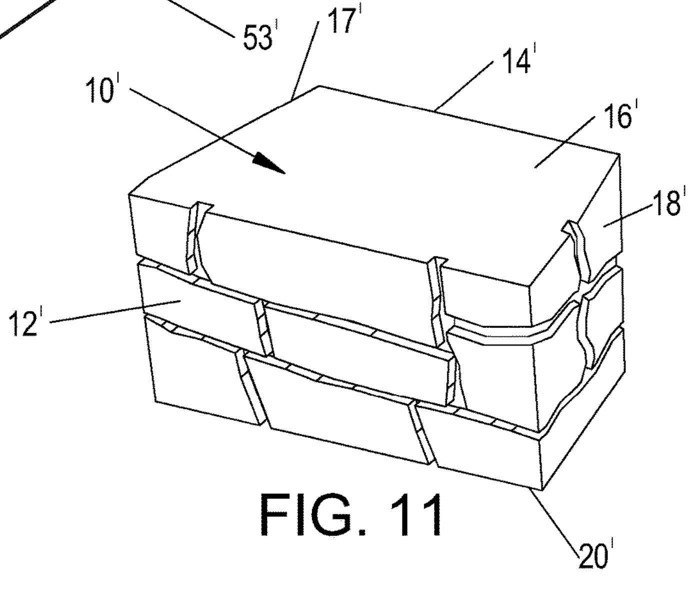
FIG. 11 is a perspective view of the resultant block formed in the mold of FIG. 10.

FIGS. 10 and 11 are directed to a modified form of mold 70, which conforms in all respects to the mold 50 and like parts are correspondingly enumerated to the mold illustrated in FIG. 7. The major departure is in the formation of a textured surface at one end 54' and the location of keyways 72 at opposite ends of the front wall 52' opposite to the textured surface in the front wall 55. An additional keyway 74 is formed in the opposite end wall 53' to the textured end surface 54'. In this way, upon completion of the casting process curing of the concrete block within the mold, both walls 52' and 53' may be peeled away from the rear wall surface 14' and the end wall opposite to the textured wall surface 54'. The block 10' is illustrated in FIG. 11 and comprises a front textured wall surface 12' and a rear wall surface 14' which is tapered downwardly from top horizontal surface 16'. Similarly, opposite sidewall 17' tapers downwardly from the top surface 16', and along with the front, rear sidewall surfaces 12', 14' and 18' terminate in the bottom horizontal surface 20' which is parallel to the top surface 16'. The rear surface 14' is formed with a cavity (not shown) and the bottom surface is formed with a cavity that extends a partial length of the bottom surface 20' due to the presence of the sidewall 18'.

Although preferred and modified forms or embodiments are herein set forth and described, the above and other modifications and changes may be made as well as their intended application for uses other than retaining walls without departing from the spirit and scope.

We claim:

1. A masonry block, comprising:

a top surface;

a bottom surface having a first cavity extending upwardly from the bottom surface, the bottom surface including a front outer perimeter edge that is larger than a rear outer perimeter edge, the bottom surface surrounds the first cavity on two sides;

a rear surface tapered downwardly from the top surface to the bottom surface, the rear surface including a second cavity;

at least one textured external wall surface simulating the appearance of stone or brick, the textured external wall surface oriented vertically when the top surface and the bottom surface are oriented horizontally; and wherein the second cavity has a maximum depth at a top end of the second cavity that is nearest to a top surface of the masonry block and a minimum depth that is smaller than the maximum depth.

2. The masonry block of claim 1, wherein the first cavity has angled walls that extend inwardly towards one another.

3. The masonry block of claim 2, wherein the angled walls form an inverted generally V-shaped configuration.

4. The masonry block of claim 2, wherein the angled walls are oriented at non-equal angles with respect to the bottom surface.

5. The masonry block of claim 1, wherein the minimum depth is at a bottom end of the second cavity that is nearest to a bottom surface of the masonry block.

6. The masonry block of claim 5, wherein the textured external wall surface is a front surface.

7. The masonry block of claim 6, wherein the textured external wall surface is 16 inches wide.

8. The masonry block of claim 5, wherein the second cavity includes a vertical wall that is perpendicular to the top surface.

9. The masonry block of claim 8, wherein the vertical wall of the second cavity is surrounded by the rear surface on at least two sides.

10. The masonry block of claim 1, wherein end walls taper inwardly from the textured external wall surface to the rear surface, such that a width of the textured external wall surface is larger than a width of the rear surface.

11. The masonry block of claim 1, wherein the bottom surface includes a front portion and a rear portion, the front portion of the bottom surface entirely separated from the rear portion of the bottom surface by the first cavity, the front portion coplanar with the rear portion.

12. A masonry block, comprising:

a top surface;

a rear surface tapered downwardly from the top surface to a flat bottom surface, the rear surface including a cavity that has a maximum depth at a top end of the cavity that is nearest to the top surface and a minimum depth that is smaller than the maximum depth; and at least one textured external wall surface simulating the appearance of stone or brick, the textured external wall surface oriented vertically when the top surface and the bottom surface are oriented horizontally.

13. The masonry block of claim 12, wherein the bottom surface has a recessed portion extending upwardly from the bottom surface, the bottom surface including a front outer perimeter edge that is larger than a rear outer perimeter edge, the bottom surface surrounds the recessed portion on two sides.

14. The masonry block of claim 13, wherein the recessed portion has angled walls that extend inwardly towards one another.

15. The masonry block of claim 14, wherein the angled walls form an inverted generally V-shaped configuration.

16. The masonry block of claim 14, wherein the angled walls are oriented at non-equal angles with respect to the bottom surface.

17. The masonry block of claim 13, wherein the minimum depth at a bottom end of the cavity is nearest to the bottom surface.

18. The masonry block of claim 13, wherein the textured external wall surface is a front surface.

19. The masonry block of claim 18, wherein a distance between the front surface to the rear surface is between 8 inches and 9 inches.

20. The masonry block of claim 13, wherein the textured external wall surface is 16 inches wide.

21. The masonry block of claim 13, wherein end walls taper inwardly from the textured external wall surface to the rear surface, such that a width of the textured external wall surface is larger than a width of the rear surface.

22. The masonry block of claim 13, wherein the bottom surface includes a front portion and a rear portion, the front portion of the bottom surface entirely separated from the rear portion of the bottom surface by the recessed portion, the front portion coplanar with the rear portion.

23. The masonry block of claim 12, the cavity includes a vertical wall that is parallel to the textured external wall surface.

* * * * *